June 9, 1942.  A. O. BROOKS  2,285,894
FILTER SEPTUM SUPPORTING MEANS
Filed Dec. 14, 1940
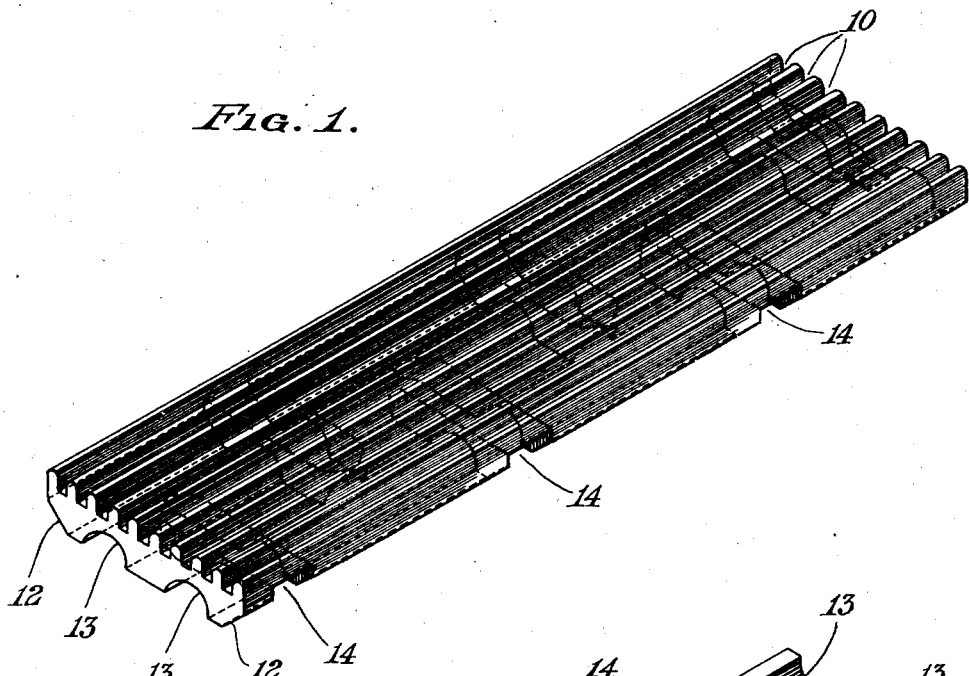
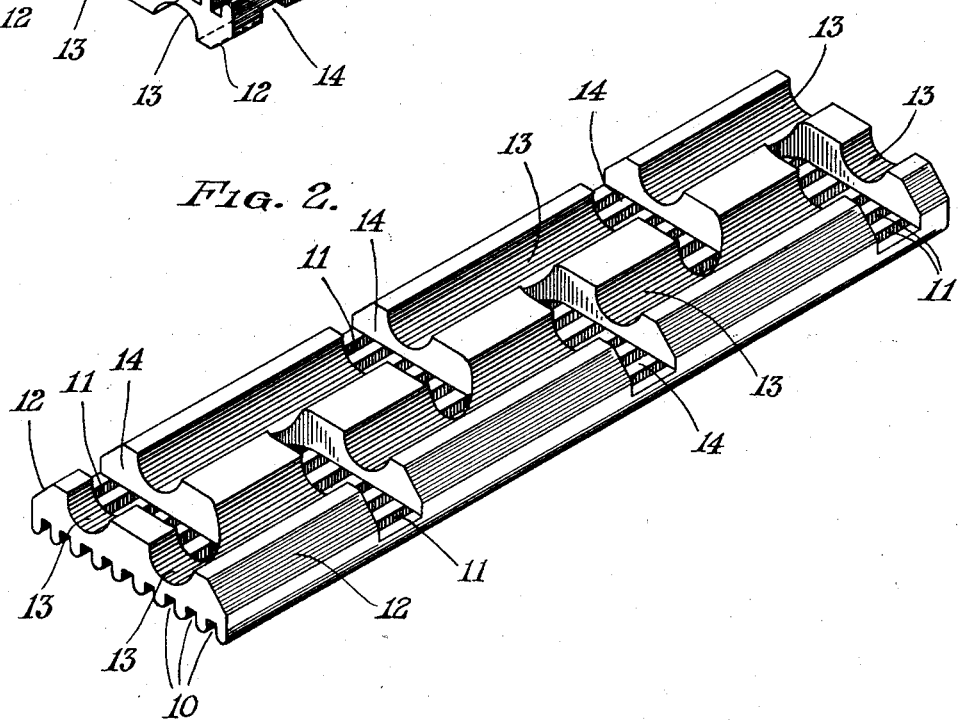
ARLAND OTTIS BROOKS.
INVENTOR.
BY Charles F. Kaegebeh
ATTORNEY.

Patented June 9, 1942

2,285,894

UNITED STATES PATENT OFFICE 2,285,894

FILTER SEPTUM SUPPORTING MEANS

Arland Ottis Brooks, Kimmswick, Mo., assignor to National Lead Company, New York, N. Y., a corporation of New Jersey Application December 14, 1940, Serial No. 370,093

6 Claims. (Cl. 210—199)

The invention relates to filters, particularly rotary type vacuum filters.

Rotary vacuum filters are well known in the industrial arts. They consist essentially of a hollow rotary drum the surface of which supports a layer of solids being filtered while the interior is provided with means which alternatively, as the drum rotates, applies vacuum or pressure to the surface supporting the solids.

The drum rotates on its horizontal axis dipping into a tank containing a slurry of the solids to be filtered. A frictional valve assembly is connected to a fixed pipe, communicating with a vacuum source and to a second fixed pipe, communicating with a pressure, or blow-back, source. The valve assembly is so adjusted that the portion of the drum passing through the slurry of solids is under vacuum which is communicated through the pipe having branch connections, passing through an outlet in the surface of the drum. These branch connections communicate with grooved means for supporting the filter septum. These grooved means and filter septum extend around the entire surface of the drum.

As the drum is rotated by means of suitable mechanism the lower portion of the drum which dips into the slurry contained in the tank being under vacuum created through the vacuum pipes, picks a layer of solids upon its surface, the filtrate passing out through the vacuum system. The valve assembly is also so adjusted that vacuum is maintained over the entire ascending side of the drum and over about one-half of the descending side. As the layer of solids is carried up the ascending and down that portion of the descending side which is under vacuum, washing liquid is usually distributed over the surface of the layer of solids. This liquid is drawn through the layer of solids and the filter septum by means of the vacuum; thence through the communicating grooves in the filter septum support it passes into the vacuum system. As the layer of solids adhering to the filter surface is carried toward the lower half of the descending side of the drum, the valve assembly permits pressure to be applied by means of blow-back pipe and the grooved filter septum support to the under surface of the filter septum, supporting the layer of solids. In this blow-back operation the layer of solids by means of the pressure applied, is dislodged from the filter septum and removed by any suitable means, such as a doctor blade.

It will be observed that the filter septum supporting means of the rotary filter must be made of sections which are alternatively under vacuum and pressure and that simultaneously while at least one section is under pressure the remaining sections are under vacuum. The individual sections are formed of a plurality of grooved filter septum supporting units and end units. The end units function as division strips separating the several sections from each other, and at the same time, fit tightly to the drum surface over its entire length, thus making it possible for one section to be under pressure while adjacent sections are under vacuum.

The principal object of the present invention is to provide a filter septum supporting unit or means which by its novel manner of construction is adapted to provide the same effective filtrate drainage area as obtainable by the prior art; while at the same time, greatly increasing the strength and life of said supporting means over that of the prior art filter septum supporting means. This and other objects of the invention will be apparent from the specification when considered with the accompanying drawing.

Figs. 1 and 2 represent a preferred embodiment of the present invention.

Fig. 1 is a top view in perspective of the novel filter septum supporting means and Fig. 2 is a bottom view in perspective thereof.

With reference to Fig. 1 the novel filter septum supporting unit is grooved, 10, laterally over the entire length of its top surface. These grooves are adapted to receive filtrate passing through a filter septum and are disposed on the surface of the supporting unit in parallel relation to each other. They may be parallel with respect to the horizontal axis of the unit or positioned at an angle in relation thereto. These grooves, as many in number as may be desired, communicate at 11 with interior channels which in turn communicate with the pressure and vacuum system.

With reference to Fig. 2, the novel filter septum supporting means will preferably have beveled-edged sides, 12, and are grooved at 13. These grooves extend laterally the entire length of the unit along the horizontal axis of the drum. The invention is not limited to any number of such grooves but as desired one or more may be provided. Intersecting these grooves, 13, at substantially right angles and at frequent intervals along the length of the unit are recesses, 14. These recesses, 14, are cut through the unit inwardly from the beveled-edged sides thereof at a depth sufficient to establish communication at 11, with grooves, 10, cut into the top surface of the intermediate unit and terminating short of the opposite beveled-edged side of the unit. Preferably, alternate recesses will cut inwardly from opposite sides of the unit through the beveled edges thereof creating a staggered relationship. For most efficient drainage the closed end of the staggered recesses should extend beyond the closed end of the adjacent recesses, 14, on either side. This is accomplished when the length of recess is more than half the width of the filter septum supporting unit. The beveled edges of the abutting sides of adjacent intermediate units form channels.

The end units and the intermediate units, 12, are constructed of any suitable material, for instance, wood, and are individually attached to the drum surface in any convenient manner, preserving the above-described arrangement. The drum surface being usually of wood, the attachment may be made by means of nails, screws and the like.

The section functions, during the vacuum phase, in the following manner:

A vacuum is created in the groove, 13, by means of the vacuum pipe which communicates through the valve assembly to the vacuum line. The vacuum is communicated through the grooves, 13, to the recesses, 14, and thence throughout the section until ultimately the communication of vacuum is sealed off by the next adjacent end piece. The liquid which is sucked through the filter septum at 11, into the recesses, 14, travels along the path of the vacuum into the groove 13, and is drawn through outlet of the vacuum pipe. It will be seen that the path of the vacuum and the filtrate is a staggered one.

The section functions, during the blow-off phase, in the reverse manner. For certain filtering operations, for instance, when a layer of pre-coat material is employed, the blow-back phase of the cycle is omitted. It will be understood that the present invention is applicable to rotary filters generally and is not limited to use only in connection with a rotary filter operated with a blow-back phase.

It is to be observed that the novel construction of my intermediate units with their staggered recesses affords an effective drainage area equal to that of prior art devices, and in addition imparts to the filter septum supporting means an increased strength many times greater than filter septum supporting means of the prior art. For instance, a filter septum supporting means in accordance with the present invention will be about five times as strong as one of the prior art and will generally last longer.

The foregoing description and drawing of my invention have been given merely for illustrative purposes and no undue limitations should be deduced therefrom. It is obvious that various changes may be made within the scope of the claims appended hereto, and in the details of construction without departing from the spirit of the invention.

I claim:

1. A filter septum supporting unit having on one surface a plurality of lengthwise extending grooves adapted to receive filtrate passing through a filter septum, the opposite surface thereof being channelled along its length and provided with a plurality of crosswise recesses of sufficient depth to establish a communication between the said grooves and channelling said recesses being open at one edge of the filter septum supporting unit and extending only part way across the said unit.

2. A filter septum supporting unit having on one surface a plurality of lengthwise extending grooves parallel to each other and adapted to receive filtrate passing through a filter septum, the opposite surface thereof being channelled along its length and provided with a plurality of crosswise recesses of sufficient depth to establish a communication between the said grooves and channelling, said recesses being open at one edge of the filter septum supporting unit and extending only part way across the said unit.

3. A filter septum supporting unit substantially rectangular in shape having on one surface a plurality of grooves parallel with the longer sides of the rectangle and adapted to receive filtrate passing through a filter septum, the opposite surface thereof being channelled along its length parallel with the longer sides of the rectangle and also provided with a plurality of recesses open at one of the longer sides of the rectangle and extending parallel with the shorter sides of the rectangle part way across the channelled surface at a sufficient depth to establish a communication between the said grooves and channelling.

4. A filter septum supporting unit substantially rectangular in shape having on one surface a plurality of grooves parallel with the longer sides of the rectangle and adapted to receive filtrate passing through a filter septum, the opposite surface thereof being channelled along its length parallel with the longer sides of the rectangle and also provided with a plurality of recesses alternately opening at opposite longer sides of the rectangle and extending parallel with the shorter sides of the rectangle part way across the channelled surface at a sufficient depth to establish a communication between the said grooves and channelling to permit the passage of filtrate from the grooves into the channelling.

5. A filter septum supporting unit substantially rectangular in shape having on one surface a plurality of grooves parallel with the longer sides of the rectangle and adapted to receive filtrate passing through a filter septum, the opposite surface thereof being channelled along its length parallel with the longer sides of the rectangle and also provided with a plurality of recesses alternately opening at opposite longer sides of the rectangle and extending parallel with the shorter sides of the rectangle more than half way across the channelled surface, at a sufficient depth to establish a communication between the said grooves and channelling to permit the passage of filtrate from the grooves into the channelling.

6. The combination in a rotary filter of the character described of a hollow drum; a filter septum on the surface of said drum and means interposed between the drum and the filter septum for supporting the said filter septum, the supporting means comprising a plurality of individual units substantially rectangular in shape having on the surface in contact with the filter septum a plurality of grooves parallel with the longer sides of the rectangle and adapted to receive filtrate passing through the filter septum, the opposite surface in contact with the hollow drum being channelled along its length parallel with the longer sides of the rectangle and also provided with a plurality of recesses alternately opening at opposite longer sides of the rectangle and extending parallel with the shorter sides of the rectangle part way across the channelled surface at a sufficient depth to establish a communication between the said grooves and channelling to permit the passage of filtrate from the grooves into the channelling.

ARLAND OTTIS BROOKS.